(12) United States Patent
Miwa (10) Patent No.: US 8,478,354 B2
(45) Date of Patent: Jul. 2, 2013

(54) MOBILE COMMUNICATION TERMINAL APPARATUS

(75) Inventor: Tomoaki Miwa, Osaka (JP)

(73) Assignee: Kyocera Corporation (JP)

( * ) Notice: Subject to any disclaimer, the term of this patent is extended or adjusted under 35 U.S.C. 154(b) by 193 days.

(21) Appl. No.: 13/167,580

(22) Filed: Jun. 23, 2011

(65) Prior Publication Data

US 2011/0319141 A1    Dec. 29, 2011

(30) Foreign Application Priority Data

Jun. 28, 2010    (JP) .................................. 2010-145752

(51) Int. Cl.
*H04M 1/00*    (2006.01)

(52) U.S. Cl.
USPC ..................... 455/567; 455/412.1; 455/412.2; 455/418; 455/566; 455/574

(58) Field of Classification Search
USPC ................ 455/412.1, 412.2, 414.1, 418, 566, 455/567, 574
See application file for complete search history.

(56) References Cited

U.S. PATENT DOCUMENTS

| | | | |
|---|---|---|---|
| 6,687,515 B1 * | 2/2004 | Kosaka | 455/566 |
| 7,155,260 B2 * | 12/2006 | Tanaka et al. | 455/566 |
| 7,469,155 B2 * | 12/2008 | Chu | 455/567 |
| 7,825,917 B2 * | 11/2010 | Bryant et al. | 345/207 |
| 8,289,248 B2 * | 10/2012 | Kunkel | 345/84 |
| 2006/0073819 A1 * | 4/2006 | Lowles | 455/418 |
| 2008/0125184 A1 * | 5/2008 | Sano | 455/567 |
| 2009/0278828 A1 * | 11/2009 | Fletcher et al. | 345/207 |
| 2009/0298549 A1 * | 12/2009 | Lai | 455/566 |
| 2011/0281568 A1 * | 11/2011 | Le Clech | 455/415 |

FOREIGN PATENT DOCUMENTS

JP    2008-022406 A    1/2008

* cited by examiner

*Primary Examiner* — Olumide T Ajibade Akonai
(74) *Attorney, Agent, or Firm* — Studebaker & Brackett PC (57) ABSTRACT

A mobile communication terminal apparatus having a communication function, the mobile communication terminal apparatus includes: a light emitting unit configured to indicate call incoming information or mail receiving information by light emission; a notification setting unit configured to set whether to indicate at least one of the call incoming information and the mail receiving information by using at least one of a sound and a vibration; a brightness detecting unit, which detects a brightness when the notification setting unit set to not indicate by using both of the sound and the vibration; and a light-emission control unit, which controls the light emitting unit to not emit light, when the notification setting unit set to not indicate by both the sound and the vibration by the notification setting unit and when the brightness detected by the brightness detecting unit is a predetermined brightness or less.

9 Claims, 9 Drawing Sheets

MOBILE COMMUNICATION TERMINAL APPARATUS

CROSS-REFERENCE TO RELATED APPLICATION

This application claims priority from Japanese Patent Application No. 2010-145752 filed on Jul. 28, 2010, the entire subject matter of which is incorporated herein by reference.

BACKGROUND OF THE INVENTION

The present invention relates to a mobile communication terminal apparatus having a silent mode function.

Recently, mobile communication terminal apparatus capable of outgoing and receiving calls or transmitting and receiving mails has a so-called manner mode for the notification of the incoming call or the mail reception by a vibration produced by a vibrator or the like, not by a sound.

The mobile communication terminal apparatus also has a so-called silent mode, in which the incoming call or the mail reception is indicated only by light emission, not by the vibration and the sound.

However, since a mobile communication terminal apparatus set in a manner mode or a silent mode indicates the outgoing and receiving calls or the transmitting and receiving mails by the light emission, it is not preferable to use the manner mode or the silent mode in places such as a theater, etc, where light emitting to the environment is not preferable.

For example, JP-A-2008-022406 describes a mobile phone which does not indicate an incoming call if setting is performed to suppress not only a sound and vibration but also the light emission.

SUMMARY

However, in the case of the mobile phone described in JP-A-2008-022406, if the setting is set to not indicate incoming call once, the incoming call is not indicated until the setting is changed again. Therefore, in order to indicate incoming call, it is required to operate to change the setting.

The present invention is to provide a mobile communication terminal apparatus having a silent mode capable of indicating according to the situation of the environment.

The mobile communication terminal apparatus according to the illustrative aspect includes: a light emitting unit configured to indicate call incoming information or mail receiving information by light emission; a notification setting unit configured to set whether to indicate at least one of the call incoming information and the mail receiving information by using at least one of a sound and a vibration; a brightness detecting unit, which detects a brightness when the notification setting unit set to not indicate by using both of the sound and the vibration; and a light-emission control unit, which controls the light emitting unit to not emit light, when the notification setting unit set to not indicate by both the sound and the vibration by the notification setting unit and when the brightness detected by the brightness detecting unit is a predetermined brightness or less.

The mobile communication terminal apparatus according to the illustrative aspect includes the brightness detecting unit and the light-emission control unit, and can be set in the silent mode to detect the brightness of the environment by the brightness detecting unit and control the light emission of the light emitting unit according to the detection result as needed. Therefore, in a case where the environment is too dark and thus it is not preferable to emit the light, it is possible to control the light emitting unit to not emit the light. Further, since the light is not emitted, a consumed power can be reduced.

DETAILED DESCRIPTION OF THE INVENTION

A mobile communication terminal apparatus according to an illustrative aspect of the present invention will be described.

[Configuration]

The mobile communication terminal apparatus according to the illustrative aspect of the present invention is a terminal apparatus, which includes a light emitting unit and is capable of communication with the outside. The mobile communication terminal apparatus may be a mobile phone terminal apparatus, a personal handy-phone system (PHS), a personal digital assistant (PDA) capable of communication with the outside, etc.

Hereinafter, a configuration of a mobile phone terminal apparatus according to the illustrative embodiment of the mobile communication terminal apparatus will be described.

Figure 1:
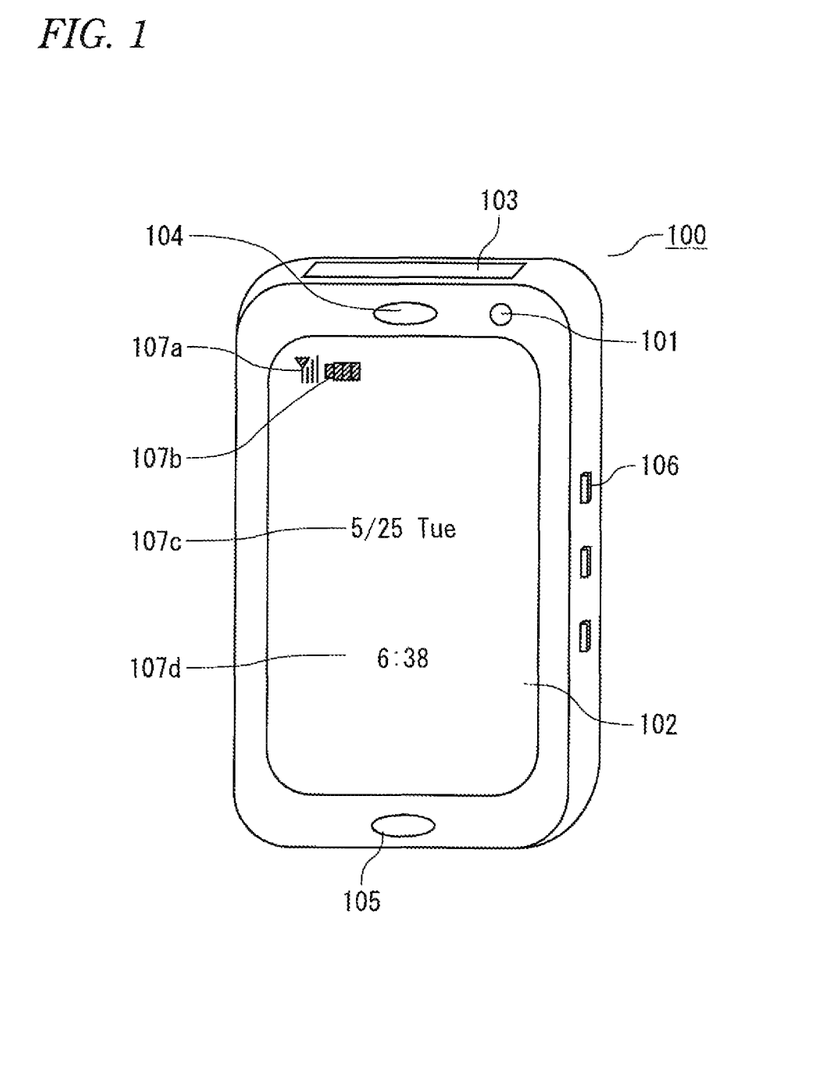
FIG. 1 is a perspective view illustrating an appearance of a mobile phone terminal apparatus according to an illustrative embodiment of the present invention.

FIG. 1 is a perspective view illustrating an appearance of a mobile phone terminal apparatus. FIG. 1 shows a straight-type mobile phone terminal apparatus 100 having a touch panel in a display unit 102, as an example. The touch panel may be configured by various types, such as a capacitive type, a resistive film type, an optical type, an ultrasonic type, an ultrasonic surface acoustic wave type, an infrared-ray blocking type, an electromagnetic induction type, an image recognition type, etc.

The mobile phone terminal apparatus of the illustrative embodiment, as described above, is the straight-type mobile phone terminal apparatus 100. However, a folding-type mobile phone terminal apparatus, a slide-type mobile phone terminal apparatus, or the like may be used.

The appearance of the mobile phone terminal apparatus 100 as shown in FIG. 1 includes a lamp 101, a display unit 102, a light sensor 103, an ear piece (receiver) 104, a mouth piece (microphone) 105, and an operation unit 106.

The lamp 101 is configured to emit light to the outside to inform a user of call incoming information such as a call being received, a missed call exiting, and the like, or mail receiving information such as a received new mail, existence of a missed mail, and the like. The lamp 101 can also inform the user of the time for an alarm date and time or the like. The lamp 101 is configured by a light emitting element such as an LED or the like. The lamp 101 may be an LED lamp, etc. The lamp 101 is turned on and is flashed to emit light to indicate the user.

The display unit 102 displays various kinds of information 107 to perform the functions of the mobile phone terminal apparatus 100. The various kinds of information 107 may include an electrical wave signal strength 107a, a remaining battery level 107b, a date 107c, and a time 107d, as shown in FIG. 1. The various kinds of information 107 may further include a function menu, an address book, a received-call history, a made-call history, a transmitted-mail history, a received-mail history, text data and image data stored in a data folder, and so on. The display unit 102 may be a liquid crystal display unit, an organic electro-luminescence (EL) display unit, a plasma display unit, an electronic paper, etc. In a case where the display unit 102 is a liquid crystal display unit, a backlight of the display unit 102 emits light to display the various kinds of information 107. In a case where the display unit 102 is an organic EL display unit, a luminescent material of the display unit 102 emits light to display the various kinds of information 107.

In the case of FIG. 1, the display unit 102 includes a touch panel input unit. The touch panel input unit appears on a portion of the display unit 102 depending on the situation.

The light sensor 103 functions as a brightness detecting unit to detect the brightness of the environment. The light sensor 103 is disposed in the upper portion of the mobile phone terminal apparatus 100 in FIG. 1. The position is not limited thereto. The light sensor 103 is set in anywhere, in which the surrounding environment can be accurately detected. However, in the illustrative embodiment, the lamp 101 is also disposed in the upper portion of the mobile phone terminal apparatus 100. The light sensor 103 is disposed in a vicinity of the light emitting unit. Accordingly, the light sensor 103 can accurately detect whether to allow the light emission by the lamp 101. The light sensor 103 may be a light sensor using a photo transistor, a photo diode, etc.

The light sensor 103 is used to indicate the call incoming information or the mail receiving information when the silent mode is set. The light sensor 103 may be used in other cases.

The ear piece 104 has a function of outputting a sound to the outside based on a control signal from a control unit 108 to be described below. The ear piece 104 may output a voice of an intended party.

The mouth piece 105 may be a microphone or the like, and has a function of inputting a sound from the outside, such as a voice, etc. The mouth piece 105 outputs the input sound as an analog signal to an A/D converter.

The operation units 106 receive operations input by the user. The operation of the user received by the operation units 106 is input as a signal to the control unit 108. In the case of FIG. 1, the operation units 106 have a button shape, which are pushed to perform the operation.

The mobile phone terminal apparatus 100 includes a speaker (Not shown in FIG. 1). The speaker can inform the user of the call incoming information, the mail receiving information, the time for the alarm date and time, and the like by melodies, a ring tone, etc. The position of the speaker is not limited in detail, but the speaker may be provided in the front, side, or back of the mobile phone terminal apparatus 100.

Figure 2:
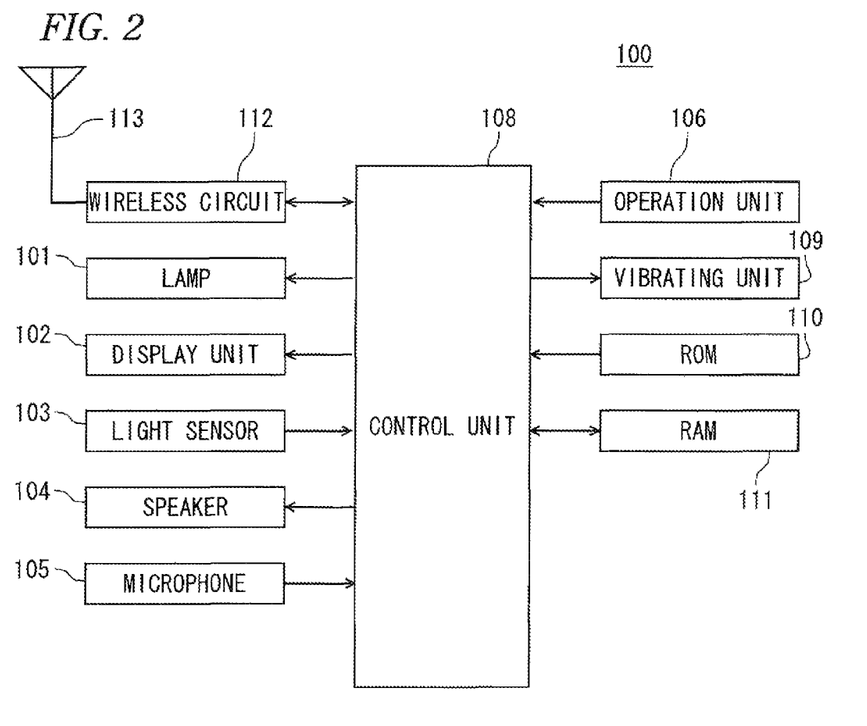
FIG. 2 is a block diagram illustrating a configuration of the mobile phone terminal apparatus according to the illustrative embodiment of the present invention.

FIG. 2 is a block diagram illustrating a configuration of the mobile phone terminal apparatus 100.

A vibrating unit 109 produces mechanical vibration based on a control signal from the control unit 108. The vibrating unit 109 may be configured by a motor, etc., and inform the user of the call incoming information, the mail receiving information, the time for the alarm date and time, and the like by the mechanical vibration.

A read only memory (ROM) 110 stores a program, data, and the like to perform various processes provided in the mobile phone terminal apparatus 100.

A random access memory (RAM) 111 is accessible from the control unit 108, and is used as a temporary storage area (also called as a buffer area) for the control unit 108 to perform various processes.

A wireless circuit 112 performs a demodulating process and a decoding process on a predetermined high-frequency signal input from an antenna 113 to convert the predetermined high-frequency signal into a digital voice signal. Also, the wireless circuit 112 performs an encoding process and a modulating process on a digital voice signal input from the control unit 108 to convert the digital voice signal into a high-frequency signal. Then, the wireless circuit 112 outputs the high-frequency signal to the antenna 113.

The antenna 113 receives a signal in a predetermined frequency band, converts the received signal into a high-frequency signal, and outputs a high-frequency signal to the wireless circuit 112. Also, the antenna 113 receives a high-frequency signal output from the wireless circuit 112, converts the high-frequency signal into a signal in the predetermined frequency band, and outputs the converted signal.

The control unit 108 controls software and hardware provided in the mobile phone terminal apparatus 100. For example, the control unit 108 detects input operation on the touch panel input unit of the display unit 102, the operation units 206, or the like by the user, and performs various functions of the mobile phone terminal apparatus 100. The control unit 108 executes a program stored in the mobile phone terminal apparatus 100 in cooperation with the ROM 110 or the RAM 111.

The control unit 108 may be a control CPU.

Figure 3:
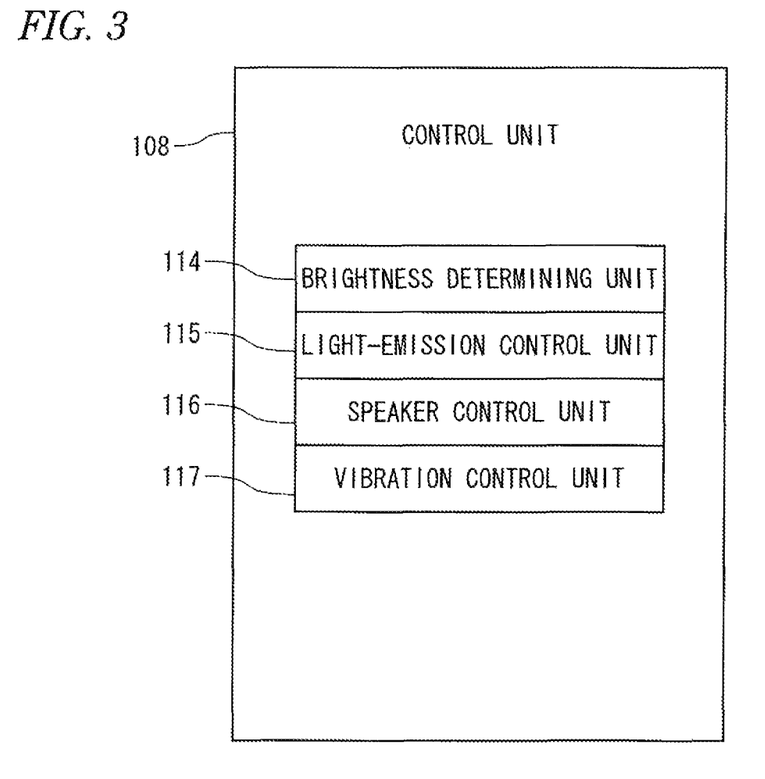
FIG. 3 is a block diagram illustrating a detailed configuration of a control unit of FIG. 2.

FIG. 3 shows the control unit 108 of FIG. 2 in detail. As shown in FIG. 3, the control unit 108 includes a brightness determining unit 114, a light-emission control unit 115, a speaker control unit 116, and a vibration control unit 117.

The brightness determining unit 114 determines whether the brightness of the environment detected by the light sensor 103 is a predetermined threshold value or less. The predetermined threshold value may be changed by an operation of the user.

One predetermined threshold value may be set, but a plurality of predetermined threshold values may be set. For example, the plurality of predetermined threshold values may be set, when a first brightness, which is a predetermined threshold value used for the light-emission control unit 115 (to be described below) to determine the brightness of the environment, is different from a second threshold value, which is a predetermined threshold value used for the light-emission control unit 115 to determine again the brightness of the environment after the light-emission control unit 115 determines the brightness of the environment is the first brightness or less.

The first brightness and the second brightness may be equal to each other. However, in a case where the first brightness is greater than the second brightness, the light-emission control unit 115 can quickly detect the change in the brightness of the environment and can quickly control the light emission. Meanwhile, in a case where the first brightness is less than the second brightness, the light-emission control unit 115 is likely to maintain the previous mode and is not affected by a slight change in the brightness.

The predetermined threshold values are used in a flow (step S7 of FIG. 4 and step S11 of FIG. 5) regarding the call incoming information and a flow (step S26 of FIG. 7 and step S40 of FIG. 9) regarding the mail receiving information (to be described below), and the threshold values may be equal to and may be different from each other.

The light-emission control unit 115 controls the light emission of a light emitting unit based on the determination result of the brightness determining unit 114. For example, in the case of the mobile phone terminal apparatus 100 of FIG. 1, the control unit 108 controls the light emission of the lamp 101 and the display unit 102 which are the light emitting units. When the mobile phone terminal apparatus 100 is set in a silent mode and the brightness detected by the light sensor 103 is the predetermined threshold value or less, the light-emission control unit 115 can control the lamp 101 and the display unit 102 to not emit the light. Therefore, the consumed power of the mobile phone terminal apparatus 100 can be reduced more sufficiently. The light emission controlled by the light-emission control unit 115 also includes light emission other than the light emission to indicate the call incoming information or the mail receiving information (for example, light emission for the notification of the time for the alarm date and time, or the like).

In the silent mode, the speaker control unit 116 controls the speaker to not make a sound, and the vibration control unit 117 controls the vibrating unit 109 to not vibrate.

The above description is based the mobile phone terminal apparatus 100 having the touch panel input unit, as one example. However, the mobile phone terminal apparatus 100 may have a key input unit instead of the touch panel input unit. In a case where the key input unit emits light in response to an operation of the user, if the mobile phone terminal apparatus 100 is set in the silent mode and the brightness detected by the light sensor 103 is the predetermined threshold or less, the light-emission control unit 115 can control not only the lamp 101 and the display unit 102 but also key input unit, so as to not emit light.

The control of the light emitting units by the light-emission control unit 115 can produce greatly the above-mentioned effect on a terminal which has a light emitting unit emitting a larger amount of light (for example, a terminal having a larger-sized display unit or having two or more displays, etc.).

[Operation Process]

Figure 4:
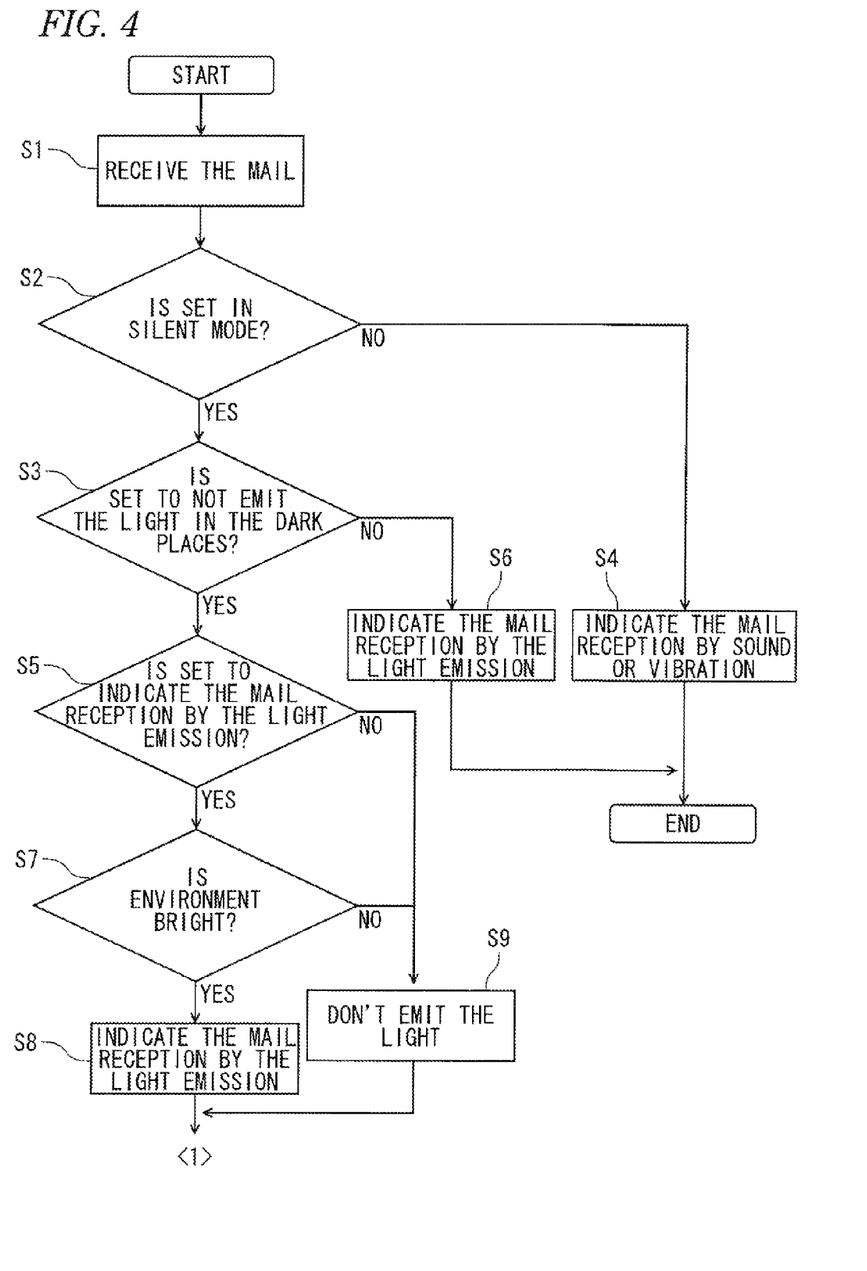
FIG. 4 is a flow chart illustrating a program applied when a mail is received.

Next, a program to execute a mail receiving process will be described with reference to FIGS. 4 and 5. The mobile phone terminal apparatus having the straight type and having a touch panel, as shown in FIG. 1, is illustrated as one example.

Figure 6A:
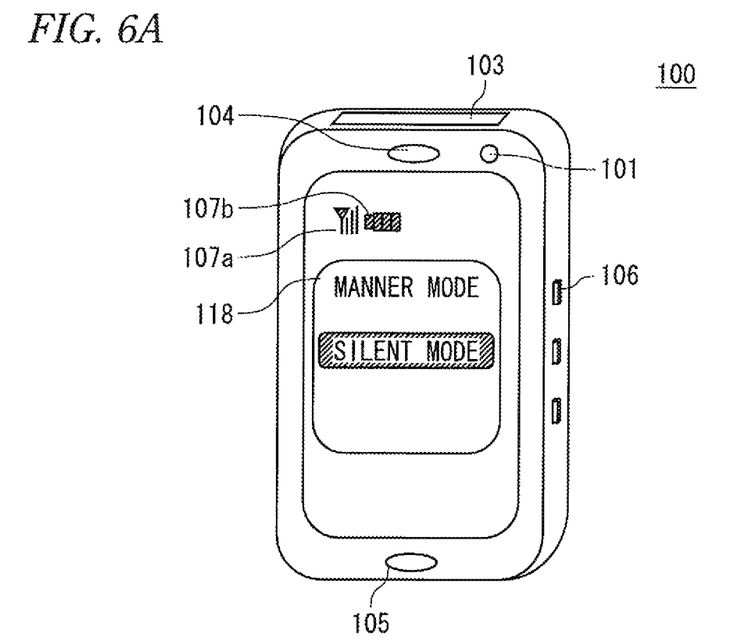
FIG. 6A is a perspective view illustrating the appearance of the mobile phone terminal apparatus 100 indicating a screen for setting a silent mode.

First, in step S1, a mail is received. Then, it is detected whether the mobile phone terminal apparatus 100 is set in the silent mode, in step S2. For example, the silent mode is set by selecting the silent mode on a selection screen 118 displayed on the display unit 102 by an operation of the user, as shown in FIG. 6A. A unit of the mobile phone terminal apparatus 100 for setting the silent mode is referred to as a notification setting unit.

Figure 6B:
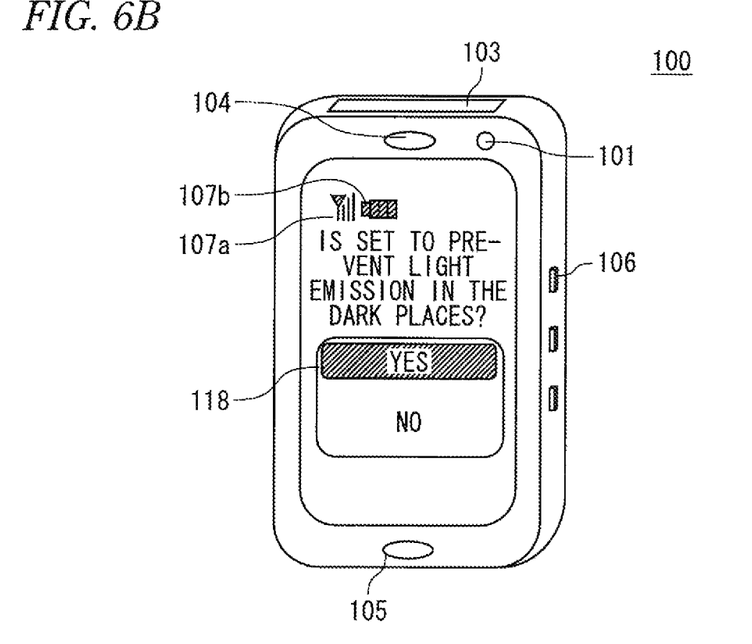
FIG. 6B is a perspective view illustrating the appearance of the mobile phone terminal apparatus 100 indicating a setting screen for selecting whether to allow a light emitting unit to emit light in the dark places.

When it is detected that the mobile phone terminal apparatus 100 is set in the silent mode (Yes, in step S2), it is detected whether the mobile phone terminal apparatus 100 is set to not emit the light in the dark places, in step S3. For example, in the case of the mobile phone terminal apparatus 100 shown in FIG. 1, it is detected whether both of the lamp 101 and the display unit 102 are set to not emit the light in the dark places. The setting to not emit the light in the dark places may be set by an option selecting for preventing light emission in the dark places on the selection screen 118 displayed on the display unit 102 by the operation of the user, as shown in FIG. 6B.

Meanwhile, when it is not detected that the mobile phone terminal apparatus 100 is set in the silent mode (No, in step S2), the mail reception is indicated by a sound or a vibration, in step S4. In FIG. 4, a flow after step S4 is omitted. Additionally, after step S4, if a checking operation of a received mail and a missed call is detected, the notification by the sound or vibration terminates. Meanwhile, when the operation is not detected, the notification continues until checking operation of an unread mail or a missed call is detected, and if the checking operation of is detected, the notification terminates.

When it is detected that the mobile phone terminal apparatus 100 is set to not emit the light in the dark places (Yes, in step S3), in step S5, it is detected whether the mobile phone terminal apparatus 100 is set to indicate the mail reception by the light emission. If the mail reception is indicated by the light emission, the mobile phone terminal apparatus 100 is set to make the lamp flash when a mail is received.

Meanwhile, when it is not detected that the mobile phone terminal apparatus 100 is set to not emit the light in the dark places (No, in step S3), since the mobile phone terminal apparatus 100 is in a normal silent mode, the mail reception is indicated by the light emission, in step S6. In FIG. 4, a flow after step S6 is omitted. After step S6, when the checking operation of a received mail and a missed call is detected, the notification by the light emission terminates. Meanwhile, when the operation is not detected, the notification continues until checking operation of an unread mail or a missed call is detected. After that, when the checking operation is detected, the notification terminate.

When it is detected that the mobile phone terminal apparatus 100 is set to indicate the mail reception by the light emission (Yes, in step S5), it is detected whether the environment of the mobile phone terminal apparatus 100 is bright, in step S7. Specifically, it is detected whether the brightness detected by the light sensor 103 is greater than the predetermined threshold value or not. Meanwhile, when it is not detected that the mobile phone terminal apparatus 100 is set to indicate the mail reception by the light emission (No, in step S5), that is, setting for indicating the mail reception by the light emission the mobile phone terminal apparatus 100 has not been set, the mobile phone terminal apparatus 100 does not emit the light, in step S9.

In a case where the environment of the mobile phone terminal apparatus 100 is bright, that is, the brightness of the environment is greater than the predetermined threshold value (Yes, in step S7), the mail reception is indicated by the light emission, in step S8. Meanwhile, in a case where the environment of the mobile phone terminal apparatus 100 is dark, that is, the brightness of the environment is the predetermined threshold value or less (No, in step S7), the mobile phone terminal apparatus 100 does not emit the light, in step S9.

Figure 5:
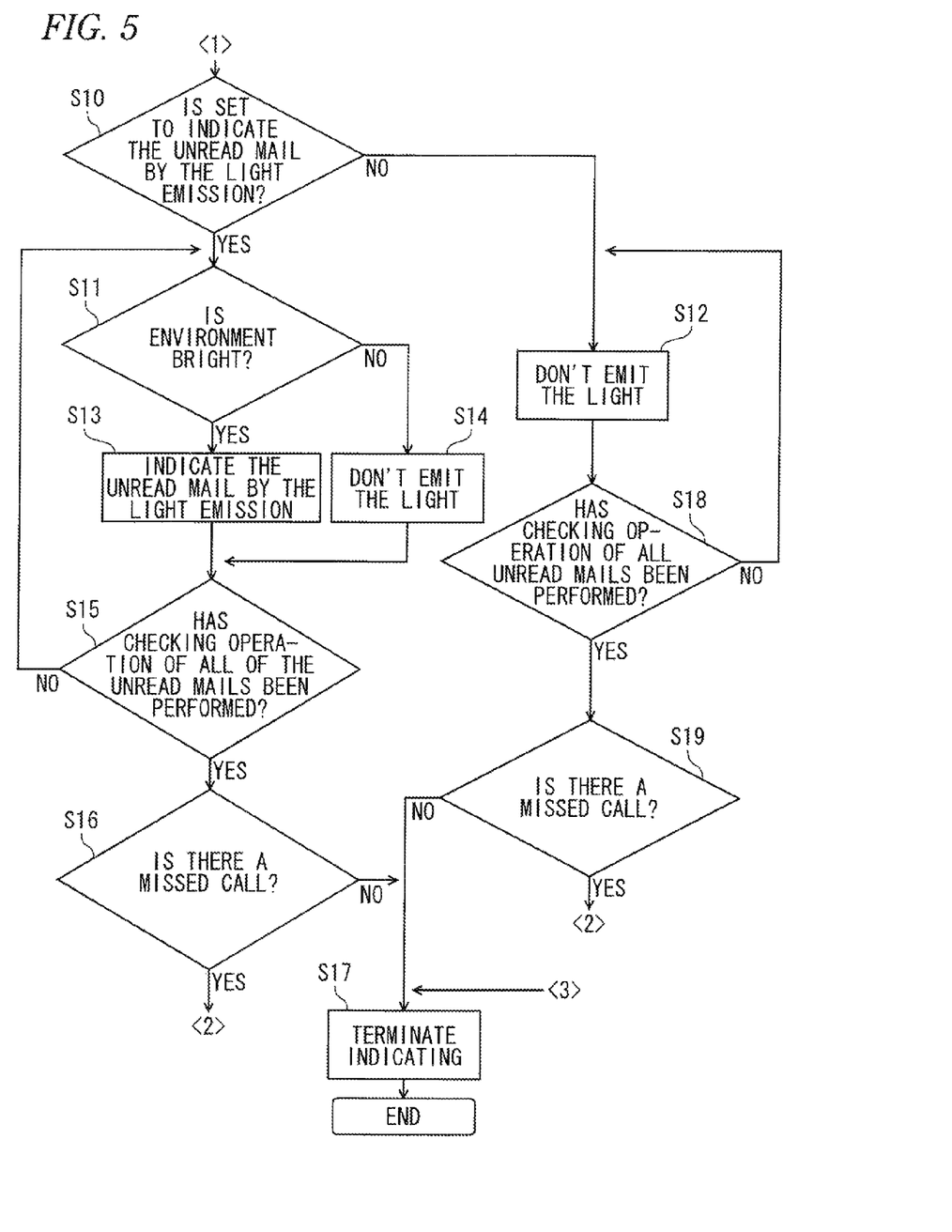
FIG. 5 is a flow chart illustrating a program applied when checking an unread mail.

After steps S8 and S9, it is detected whether to indicate a received mail, which has not been checked yet, that is, an unread mail by the light emission, as in step S10 shown in FIG. 5. An example of settings to indicate the unread mail by the light emission is a setting for controlling the lamp to flash when there is an unread mail.

In the above examples, the setting for the notification of the existence of the unread mail and the setting for the notification of the received mail are separately set. However, the setting for the notification of an unread mail and the setting for the notification of a received mail are set together (for example, as a notification lamp setting, etc). In this case, if the lamp setting is switched to ON, the setting is set to indicate both of a received mail and an unread mail, and if the lamp setting is switched to OFF, the setting is set to not indicate both of a received mail and an unread mail from being indicated.

When it is detected that the mobile phone terminal apparatus 100 is set to indicate the unread mail by the light emission (Yes, in step S10, like the case of the step S7, it is detected whether the environment of the mobile phone terminal apparatus 100 is bright or not, in step S11.

Meanwhile, when it is not detected that the mobile phone terminal apparatus 100 is set to indicate the unread mail by the light emission (No, in step S10), the mobile phone terminal apparatus 100 does not emit the light, in step S12. A flow after step S12 will be described below.

In a case where the environment of the mobile phone terminal apparatus 100 is bright, that is, the brightness of the environment is greater than the predetermined threshold value (Yes, in step S11), the unread mail is indicated by the light emission, in step S13. Meanwhile, in a case where the environment of the mobile phone terminal apparatus 100 is dark, that is, the brightness of the environment is the predetermined threshold value or less (No, in step S11), the mobile phone terminal apparatus 100 does not emit the light, in step S14.

After steps S13 and S14, it is detected whether the checking operation of all of the unread mails has been performed, in step S15.

Here, with respect to the unread mail, the checking operation may mean selecting an icon indicating existence of an unread mail displayed on a standby screen and starting a received-mail history screen, and etc. Also, with respect to the missed call, the checking operation (to be described below) may mean selecting an icon indicating existence of a missed call displayed on the standby screen and the starting a received-call history screen, and etc.

The above-mentioned checking operation of all of the unread mail may mean checking operation of all of three unread mails when the number of unread mails is three, for example.

Additionally, a plurality of predetermined threshold values for determining the brightness of the environment may be set as the above-mentioned first brightness and second brightness, When it is detected that the checking operation of all of the unread mails (Yes, in step S15), it is detected whether a missed call exists, in step S16. Step S16 is configured to follow when information to be indicated other than the unread mails exists. Meanwhile, it is not detected the checking operation of all of the unread mails (No, in step S15), the flow returns to step S11, and it is detected whether the environment of the mobile phone terminal apparatus 100 is bright or not.

As described above, when it is not detected that the checking operation of all unread mails in step S15, the flow returns to step S11. Therefore, when the brightness of the environment of the mobile phone terminal apparatus 100 is changed, it is possible to change whether to indicate the unread mail by the light emission or not, according to the change in the brightness of the environment. For example, even when the mobile phone terminal apparatus 100 having the unread mail exists in a theater, the light is not emitted in the theater.

However, when the mobile phone terminal apparatus 100 is brought to the outside of the dark place, the flow proceeds from step S15 to step S11, and the light sensor 103 detects the brightness of the environment such that it is possible to quickly indicate the unread mail by the light emission. Therefore, in the environment where the light emission is allowed, it is possible to quickly indicate the existence of the unread mail to the user.

When a missed call is detected (Yes, in step S16), the flow proceeds to step S38 of FIG. 9 to be described below. A flow after step S38 illustrates a process in a case where a missed call exists. Even when checking the unread mails finishes, if a missed call exists, the flow proceeds from step S15 to step S38 through step S16, such that it is possible to indicate the existence of the missed call.

Meanwhile, when any missed call is not detected (No, in step S16), that is, information to be indicated other than the unread mail does not exist, the notification terminates, in step S17.

After step S12, like in step S15, it is detected whether the checking operation of all of the unread mails has been performed, in step S18. When it is detected that the checking operation of all of the unread mails has been performed (Yes, in step S18), like in step S16, it is determined whether any missed call exists, in step S19. Meanwhile, when it is not detected that the checking operation of all of the unread mails has been performed (No, in step S18), the flow returns to step S12.

When a missed call is detected (Yes, in step S19), the flow proceeds to step S38 of FIG. 9 (to be described below), and when any missed call is not detected (No, in step S19), the notification terminates in step S17.

Figure 7:
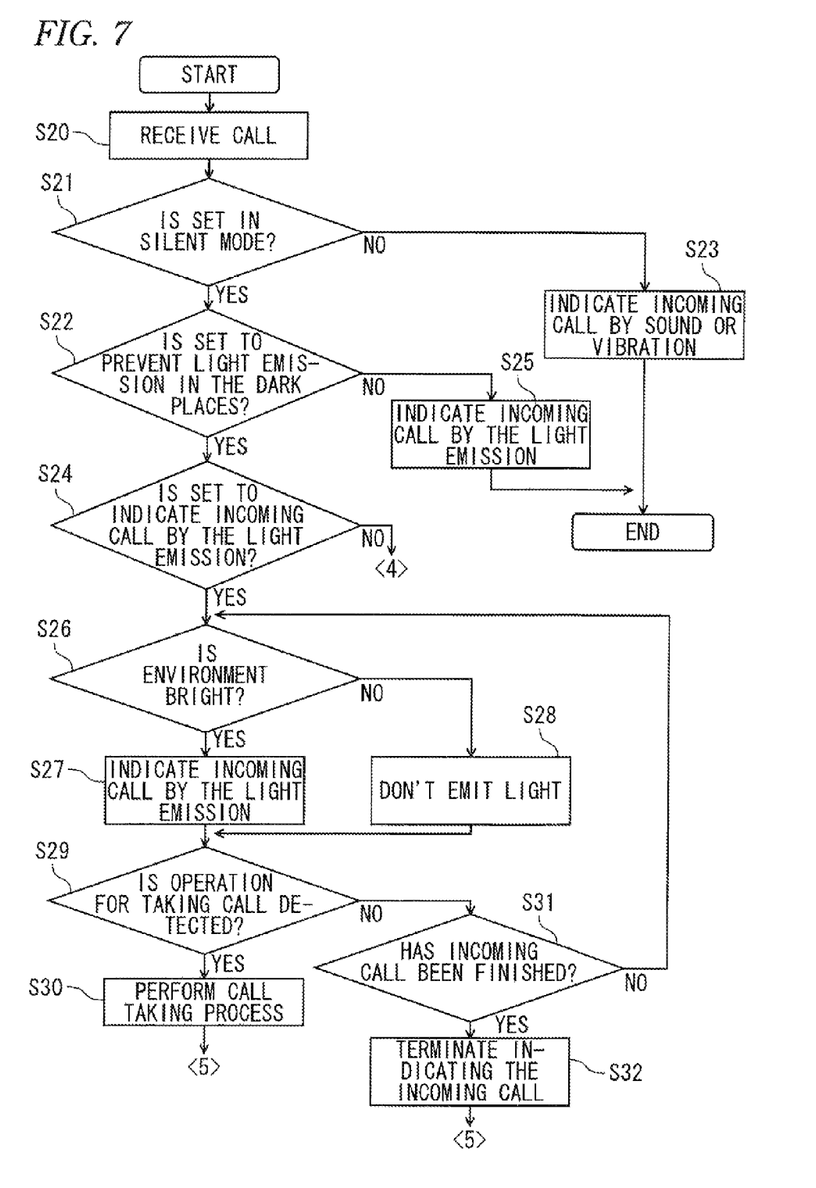
FIG. 7 is a portion of a flow chart illustrating a program applied when a call is received.
Figure 8:
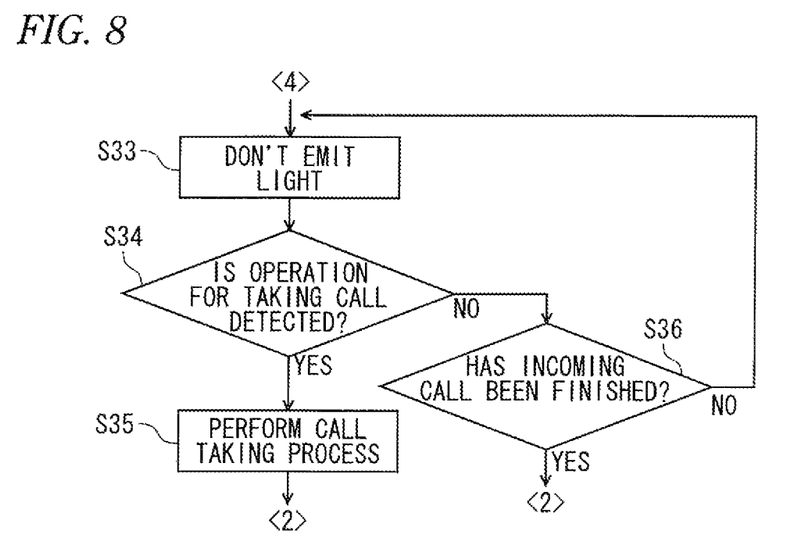
FIG. 8 is portion of the flow chart illustrating the program applied when the call is received.

Next, a program for a call receiving process will be described with reference to FIGS. 7 to 9. FIGS. 7 and 8 show a flow regarding the incoming call, and FIG. 9 shows a flow when a missed call exists after the incoming call.

Steps S20, S21, S23, and S25 are the same as steps S1, S2, S4, and S6 except that the notification subject is the incoming call or the mail reception. Accordingly, a detailed description thereof is omitted.

when it is detected that the mobile phone terminal apparatus 100 is set to indicate incoming call by the light emission (Yes, in step S24), it is detected whether the environment of the mobile phone terminal apparatus 100 is bright, in step S26.

Meanwhile, when it is not detected where the mobile phone terminal apparatus 100 is set to indicate incoming call by the light emission (No, in step S24), the light is not emitted in step S33 as shown in FIG. 8, and thereafter, the operation for taking the call is detected, in step S34. The operation for taking the call means an operation such as pushing a button for a phone conversation, etc. In this case, although the notification by the light emission is not being performed, if the user find the incoming call and the operation for taking the call is detected (Yes, in step S34), the flow proceeds to a call taking process of step S35.

The call taking process of step S35 means a process from pushing a call start button to take the call to pushing a call terminating button to terminate the call.

Meanwhile, if the operation for taking the call is not detected (No, in step S34), it is detected whether incoming call from a caller has terminated, in step S36. If the termination of the incoming call is detected (Yes, in step S36), the flow proceeds to step S38 as shown in FIG. 9. Meanwhile, if termination of the incoming call is not detected (No, in step S36), the flow returns to step S33.

Steps S26, S27, and S28 are the same as steps S7, S8, and S9 except that the notification subject is the incoming call or the mail reception. Accordingly, a detailed description thereof is omitted.

After steps S27 and 28, the operation for taking the call is detected in step S29.

Figure 9:
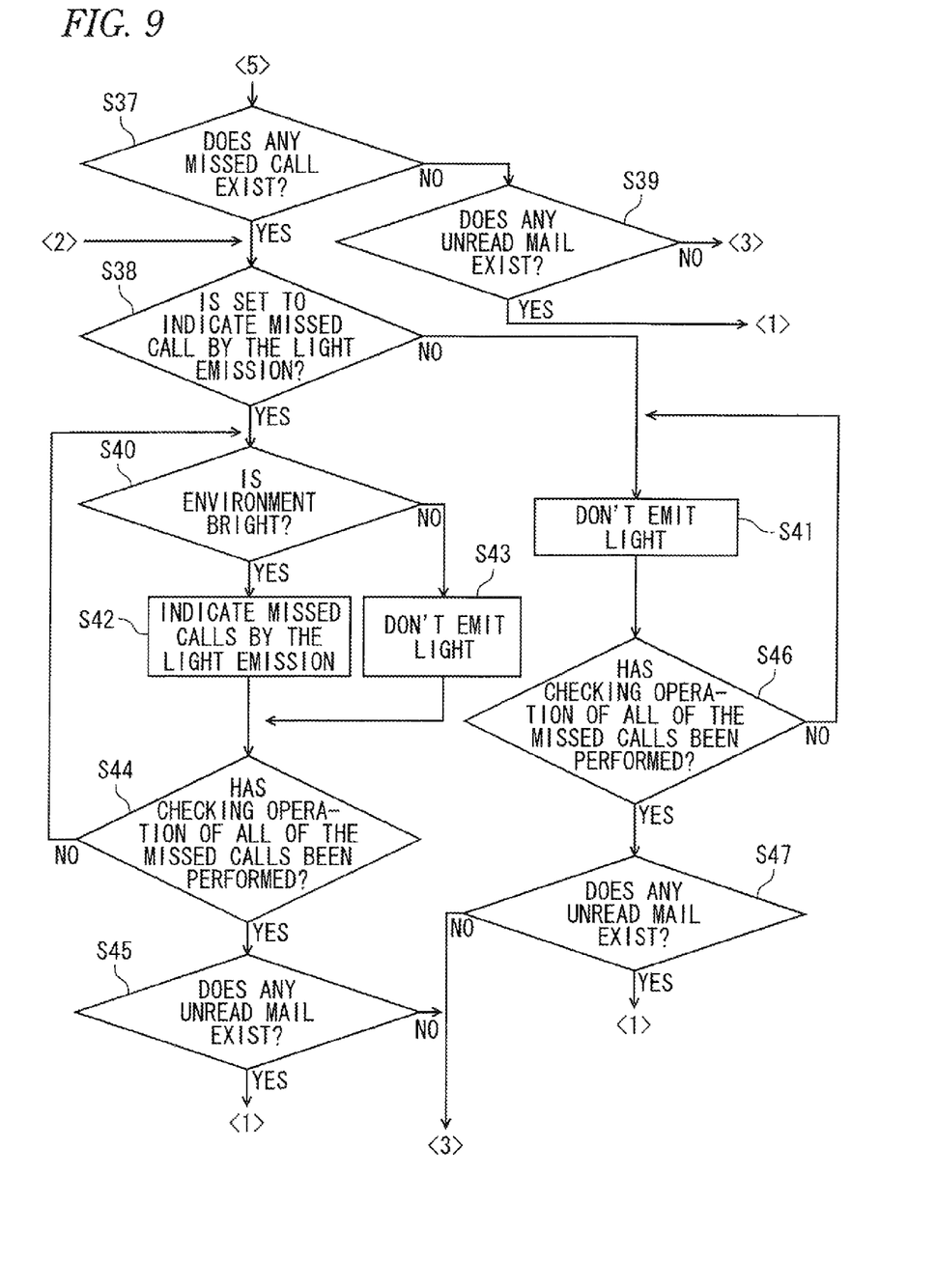
FIG. 9 is a flow chart illustrating a program applied when checking a missed call.

If the operation for taking the call is detected (Yes, in step S29), the flow proceeds to the call taking process of step S30, and then it is detected whether any missed call exists in step S37 of FIG. 9.

Meanwhile, if the operation for taking the call is not detected (No, in step S29), it is detected whether the incoming call from the caller has terminated, in step S31.

If the termination of the incoming call is detected (Yes, in step S31), in a case where the incoming call is being indicated, the notification of the incoming call terminates in step S32. Then, it is detected whether any missed call exists in step S37 of FIG. 9.

Meanwhile, if the termination of the incoming call is not detected (No, in step S31), the flow returns to step S26, and it is detected whether the environment of the mobile phone terminal apparatus 100 is bright.

As described above, if the termination of the incoming call is not detected in step S31, the flow returns to step S26 such that, when the brightness of the environment of the mobile phone terminal apparatus 100 is changed, it is possible to change whether to indicate the incoming call by the light emission, according to the change in the brightness. For example, when the incoming call is received in a dark place such as a theater or the like, the light is not emitted as described in step S28. Further, even when the operation for taking the call by the user is detected in step S29, if the termination of the incoming call is not detected in step S31, it is detected in step S26 again whether the environment is bright. At this time, if the mobile phone terminal apparatus 100 moves from the dark place to a bright place, the incoming call is indicated by the light emission. Therefore, the user can find the incoming call and quickly take the call.

In a case where the existence of the missed call is detected in step S37 of FIG. 9 (Yes, in step S37), in step S38, it is detected whether to indicate the missed call by the light emission. Meanwhile, in a case where the existence of any missed call is not detected (No, in step S37), it is detected whether any unread mail exists, in step S39.

In a case where the existence of an unread mail is detected (Yes, in step S39), the flow proceeds to step S10 of FIG. 5. Meanwhile, in a case where the existence of any unread mail is not detected (No, in step S39), the flow proceeds to step S17 of FIG. 5 and terminates the notification.

Steps S38, and S40 to S47 are the same as steps S11, and S13 to S18 except that the notification subject is the missed call or the unread mail. Accordingly, a description thereof is omitted.

If the existence of the unread mail is detected in step S45, the flow proceeds to step S10 of FIG. 5. Meanwhile, if the existence of any unread mail is not detected in step S45, the flow proceeds to step S17 of FIG. 5, and the notification terminates.

If the existence of the unread mail is detected in step S47, the flow proceeds to step S10 of FIG. 5. Meanwhile, if the existence of any unread mail is not detected in step S47, the flow proceeds to step S17 of FIG. 5, and the notification terminates.

What is claimed is:

1. A mobile communication terminal apparatus having a communication function, the mobile communication terminal apparatus comprising:
   a light emitting unit configured to indicate call incoming information or mail receiving information by light emission;
   a notification setting unit configured to set whether to indicate at least one of the call incoming information and the mail receiving information by using at least one of a sound and a vibration;
   a brightness detecting unit, which detects a brightness when the notification setting unit set to not indicate by using both of the sound and the vibration; and
   a light-emission control unit, which controls the light emitting unit to not emit light, when the notification setting unit set to not indicate by both the sound and the vibration and when the brightness detected by the brightness detecting unit is a predetermined brightness or less.

2. The mobile communication terminal apparatus according to claim 1,
   wherein the predetermined brightness has a first brightness and a second brightness,
   wherein the light-emission control unit controls the light emitting unit to not emit light when the detected brightness is the first brightness or less, and
   wherein, after the light-emission control unit controls the light emitting unit to not emit light, the light-emission control unit controls the light emitting unit to emit light when the detected brightness is greater than the second brightness.

3. The mobile communication terminal apparatus according to claim 2,
   wherein the first brightness is different from the second brightness.

4. The mobile communication terminal apparatus according to claim 2,
   wherein, when a checking operation of at least one of the call incoming information and the mail receiving information is not detected, the brightness detecting unit detects the brightness again.

5. The mobile communication terminal apparatus according to claim 1,
   wherein, when a checking operation of both of the call incoming information and the mail receiving information is detected, the light-emission control unit controls the light emitting unit to not indicate by the light emission.

6. The mobile communication terminal apparatus according to claim 1,
   wherein the call incoming information indicates that a call is being received.

7. The mobile communication terminal apparatus according to claim 1,
   wherein the call incoming information indicates that a call is missed, and
   wherein the mail receiving information indicates that an unread mail exists.

8. The mobile communication terminal apparatus according to claim 1,
   wherein the light emitting unit is at least one of a lamp and a display.

9. The mobile communication terminal apparatus according to claim 1,
   wherein the brightness detecting unit is disposed in a vicinity of the light emitting unit.

* * * * *